(12) United States Patent
Pfeifle et al.

(10) Patent No.: US 8,738,288 B2
(45) Date of Patent: May 27, 2014

(54) SYSTEM AND METHOD FOR SEARCHING FOR POINTS OF INTEREST ALONG A ROUTE

(71) Applicant: Navteq B.V., Veldhoven (NL)

(72) Inventors: Martin Pfeifle, Seewald (DE); Jonghyun Suh, Hessen (DE); Boris Gumhold, Frankfurk am Main (DE)

(73) Assignee: Navteq B.V., Veldhoven (NL)

( * ) Notice: Subject to any disclaimer, the term of this patent is extended or adjusted under 35 U.S.C. 154(b) by 0 days.

(21) Appl. No.: 14/098,202

(22) Filed: Dec. 5, 2013

(65) Prior Publication Data

US 2014/0095064 A1    Apr. 3, 2014

Related U.S. Application Data

(63) Continuation of application No. 13/332,608, filed on Dec. 21, 2011, now Pat. No. 8,620,577.

(51) Int. Cl.
| | | |
|---|---|---|
| G06F 17/30 | (2006.01) | |
| G06F 17/00 | (2006.01) | |
| G01C 21/34 | (2006.01) | |

(52) U.S. Cl.
CPC ............ *G06F 17/30* (2013.01); *G06F 17/3087* (2013.01); *G01C 21/34* (2013.01)
USPC ........................................................ 701/410

(58) Field of Classification Search
CPC ..... G06F 17/30; G06F 17/00; G06F 17/3087; G01C 21/00; G01C 21/34; G01C 21/3679
USPC ........................................................ 701/410
See application file for complete search history.

(56) References Cited

U.S. PATENT DOCUMENTS

| | | | | |
|---|---|---|---|---|
| 5,802,492 | A | * | 9/1998 | DeLorme et al. ........... 455/456.5 |
| 5,948,040 | A | * | 9/1999 | DeLorme et al. ............. 701/426 |
| 6,321,158 | B1 | * | 11/2001 | DeLorme et al. ............. 701/426 |
| 6,587,782 | B1 | | 7/2003 | Nocek et al. |
| 7,076,505 | B2 | * | 7/2006 | Campbell ..................... 701/438 |

(Continued)

FOREIGN PATENT DOCUMENTS

| | | |
|---|---|---|
| EP | 1203931 | 5/2002 |
| EP | 1698860 | 9/2006 |
| EP | 2075540 | 7/2009 |
| JP | 2011221817 | 4/2011 |

OTHER PUBLICATIONS

International Search Report and Written Opinion for related application No. PCT/EP2012/074877, mailed Apr. 2, 2013.

(Continued)

*Primary Examiner* — Thomas Tarcza
*Assistant Examiner* — Alex C Dunn
(74) *Attorney, Agent, or Firm* — Lempia Summerfield Katz LLC (57) ABSTRACT

A method and system for searching for points of interest along a route is disclosed. A relation that includes records that associate link identifiers, point of interest identifiers, and distances between the links and the points of interest is generated during the compilation process of a first version of a geographic database. The relation is stored in compiled database products. When a compiled database product is being used by a navigation system, for example, navigation application software programs use the relation to accurately and efficiently find points of interest along a computed route.

20 Claims, 6 Drawing Sheets

(56) References Cited

U.S. PATENT DOCUMENTS

| | | |
|---|---|---|
| 2002/0038180 A1 | 3/2002 | Bellesfield et al. |
| 2003/0195700 A1 | 10/2003 | Hamada et al. |
| 2004/0008225 A1* | 1/2004 | Campbell .................... 345/764 |
| 2010/0057357 A1 | 3/2010 | Miyata et al. |
| 2010/0299065 A1* | 11/2010 | Mays ........................... 701/209 |
| 2011/0066657 A1* | 3/2011 | Weiland et al. ............... 707/803 |
| 2011/0106429 A1 | 5/2011 | Poppen et al. |
| 2012/0197713 A1* | 8/2012 | Stroila et al. ................ 705/14.49 |
| 2013/0166586 A1* | 6/2013 | Pfeifle et al. ................. 707/769 |
| 2014/0005924 A1* | 1/2014 | Letz .............................. 701/424 |

OTHER PUBLICATIONS

Internatonal Search Report and Written Opinion received in related PCT Application No. PCT/EP2012/075042, Mailed Apr. 8, 2013.

* cited by examiner

SYSTEM AND METHOD FOR SEARCHING FOR POINTS OF INTEREST ALONG A ROUTE

REFERENCE TO RELATED APPLICATIONS

This application is a continuation under 37 C.F.R. §1.53(b) and 35 U.S.C. §120 of U.S. patent application Ser. No. 13/332,608 filed Dec. 21, 2011, the disclosure of which is incorporated herein by reference in its entirety. The present patent application is related to co-pending patent application Ser. No. 13/332,602, entitled "SYSTEM AND METHOD FOR USING SKYLINE QUERIES TO SEARCH FOR POINTS OF INTEREST ALONG A ROUTE," filed on the same date.

FIELD

The present invention relates generally to routing, and more particularly, relates to searching for a point of interest along a route.

BACKGROUND

Navigation systems are available that provide end users (such as drivers and passengers of the vehicles in which the in-vehicle navigation systems are installed) with various navigation-related functions and features. For example, some navigation systems are able to determine an optimum route to travel by roads between locations in a geographic region. Using input from the end user, and optionally from equipment that can determine one's physical location (such as a GPS system), a navigation system can examine various routes between two locations to determine an optimum route to travel from a starting location to a destination location in a geographic region.

The navigation system may then provide the end user with information about the optimum route in the form of guidance that identifies the driving maneuvers required to be taken by the end user to travel from the starting location to the destination location. The guidance may take the form of visual and/or audio instructions that are provided along the way as the end user is traveling the route. Some navigation systems are able to show detailed maps on computer displays outlining routes to destinations, the types of maneuvers to be taken at various locations along the routes, locations of certain types of features, and so on.

Some navigation systems can also search for points of interest (POIs) along a computed route. POIs are locations that may be of interest to a user of a navigation system. For example, POIs include hotels, restaurants, museums, stadiums, airports, hospitals, parks, and so on.

The navigation system may perform a spatial search to generate a list of POIs along the route. The spatial search finds all POIs that are within a certain Euclidean distance from any link of the calculated route. While a spatial search is efficient, it is inaccurate because it does not consider topology.

To overcome the problems associated with a spatial search, the navigation system may use topological relationships to obtain a more exact list of POIs along the route. For example, the navigation system could use the Dijkstra algorithm for each link in the route and report all POIs that are found while exploring the neighborhood of the links. The Dijkstra algorithm stops either after a certain amount of POIs have been reported or after exploring all links within a distance from any link of the route. While this approach is more accurate, it is much more time consuming and difficult to implement.

In order to provide these and other navigating functions, navigation systems use geographic data. The geographic data may be in the form of one or more databases that include data that represent physical features in a geographic region. The geographic database may include data representing the roads and intersections in a geographic region and also may include information relating to the represented roads and intersections in the geographic region, such as turn restrictions at intersections, speed limits along the roads, street names of the various roads, address ranges along the roads, and so on.

SUMMARY

A method and system for searching for a point of interest along a route is disclosed. A compiler generates a relation that associates link identifiers, point of interest identifiers, and distances between the links and the points of interest. The compiler starts the process of generating the relation by selecting either a link or a point of interest from a first version of a geographic database. After selecting a link, the compiler identifies the points of interest within a distance from the link using a routing algorithm. For each identified point of interest, the compiler adds a record into the relation that includes the link's identifier, the point of interest's identifier, and the distance between the link and the point of interest. Alternatively, the compiler selects a point of interest and identifies the links within a distance from the point of interest using a reverse routing algorithm. In either scenario, the compiler repeats the process until all (or a portion) of the links or points of interest have been selected.

The relation is stored in a compiled database product, such as a geographic database used on a navigation system platform (e.g., in-vehicle navigation system, personal navigation device, mobile telephone, server with mapping application). As a result of the relation being stored in the geographic database, the navigation system can accurately find points of interest along a calculated route or a current location efficiently.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
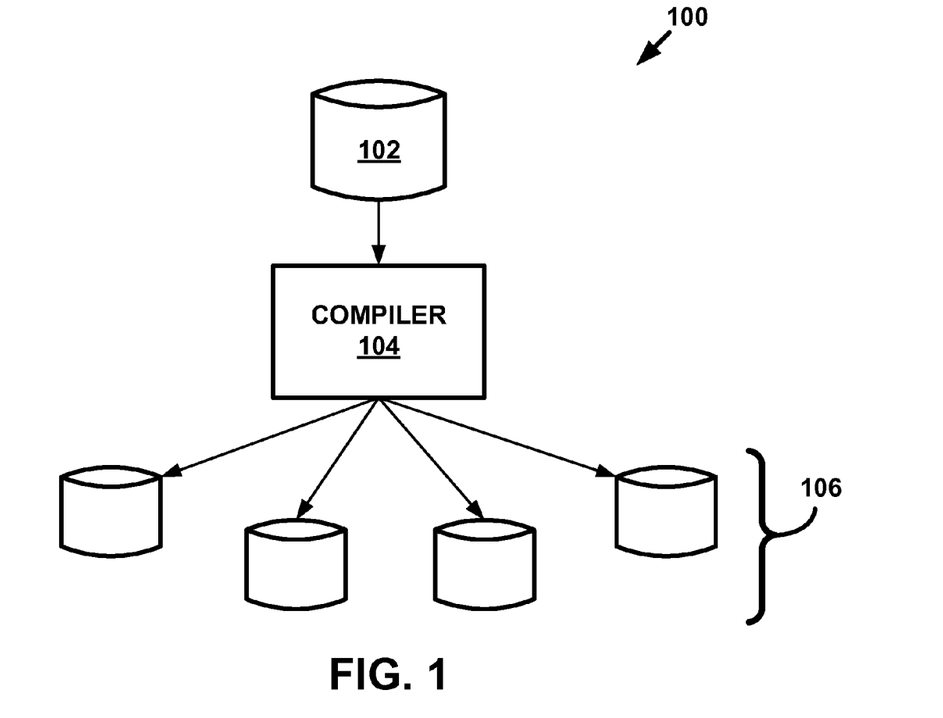
FIG. 1 is a block diagram that illustrates forming geographic database products from a first version of a geographic database, according to an example.

FIG. 1 depicts a system 100 for generating geographic database products. The system 100 includes a master version of a geographic database 102. The master version of the geographic database 102 contains data that represent geographic features in a coverage area. The coverage area may correspond to an entire country, such as the United States. Alternatively, the coverage area may correspond to several countries, such as the United States, Canada, and Mexico, or France, Germany, and Italy, and so on. According to another alternative, the coverage area of the master version of the geographic database 102 may represent only a single region within a country, such as the West Coast or the Midwest of the U.S. Although the master version of the geographic database 102 includes data that represent geographic features in the entire coverage area, there may be parts of the coverage area that contain geographic features that are not represented by data in the geographic database, or for which the representation of geographic features is sparse.

The master version of the geographic database 102 includes data about a road network located in the coverage area. The data about the road network include various kinds of information, such as the geographic coordinates of positions of the roads, street names of the roads, addresses ranges along the roads, turn restrictions at intersections of roads, and so on.

The master version of the geographic database 102 also includes data about points of interest in the covered area. Points of interest may include hotels, restaurants, museums, stadiums, offices, automobile dealerships, auto repair shops, etc. The master version of the geographic database 102 may include data about the locations of these points of interests. The master version of the geographic database 102 may also include data about places, such as cities, towns, or other communities. The master version of the geographic database 102 may include other kinds of information.

The master version of the geographic database 102 is maintained as the copy that has the most up-to-date data relating to the coverage area. Accordingly, the master version of the geographic database 102 is updated, expanded, and/or otherwise modified on a regular and continuing basis. To facilitate these operations, the master version of the geographic database 102 is stored in a format that facilitates updating, maintenance, and development. For example, the data in the master version 102 may be uncompressed. Examples of suitable formats include Oracle Spatial and VSAM although other formats, both proprietary and non-proprietary, including GDF, may be suitable. In general, the format of the master database 102 is not suitable for use in navigation systems.

The master version of the geographic database 102 is used to make compiled database products 106. In one method of operation, data from the master version of the geographic database 102 is first compiled into an intermediate or delivery format, such as GDF. Then, the database in the intermediate or delivery format is used to make the compiled database products 106. The compiled database products 106 are made using a compiler 104. The compiler 104 is a software program run on an appropriate computer platform. The compiler 104 obtains geographic data from the intermediate format database (which was formed from the master geographic database 102) and organizes the data into a format (or formats) to produce the compiled (or working) version of the geographic databases 106. The format of the compiled geographic database products 106 facilitates use of the geographic data in the end users' systems for navigation-related purposes.

The compiled database products 106 may include only portions of all the data in the master version of the geographic database 102. For example, the compiled database products 106 may include data that relate to only one or more specific sub-areas within the coverage area of the master version of the geographic database 102. Further, the compiled database products 106 may include fewer than all the data attributes that describe geographic features represented in the master version of the geographic database 102.

The compiled database products 106 are used on various kinds of computing platforms. For example, the compiled database products 106 are used in navigation systems (such as in-vehicle navigation systems and hand-held portable navigation systems), personal computers (including desktop and notebook computers), and other kinds of devices, such as tablets, mobile telephones, personal digital assistants, and so on. The compiled database products 106 are also used on networked computing platforms and environments, including systems connected to the Internet.

The compiled database products 106 are stored on media that are suitable for the hardware platforms on which they are used. For example, the compiled database products 106 may be stored on CD-ROM disks, hard drives, DVD disks, flash memory, or other types of media that are available now or that become available in the future.

In the compiled database products 106, the geographic data are organized differently than in the master or intermediate versions of the geographic database 102. A compiled database is organized, arranged, structured and stored in a form that facilitates the use of the data in the computing platform in which it is installed. A compiled database product 106 may also be stored in a compressed format on the media on which it is located.

To facilitate the search of POIs along a route, a new data attribute is stored in the compiled databases 106. This new attribute, referred to as "distance," is generated by the compiler 104 using data stored in the master or intermediate versions of the geographic database 102. The distance attribute is the distance between a link and a point of interest. A link represents a portion of a road. A point of interest is a location that a person may be interested in traveling to.

Also during compilation, the compiler 104 creates a relation that contains all links within a "reasonable distance" from a point of interest. The relation may be represented as Link2POI (LinkID, POIID, Distance), where "Distance" is the distance attribute. The reasonable distance value is provided as an input to the compiler 104. The value of the reasonable distance may be the expected maximum query distance. For example, the reasonable distance may be three kilometers.

The Link2POI relation facilitates different types of POI searches. For example, if a navigation system has calculated a route, the navigation system can use the relation to identify all points of interest that are located along any link in the route. As another example, if a point of interest is selected during destination selection, the navigation system can use the relation to find all access links that serve as a destination for the routing algorithm.

Figure 2:
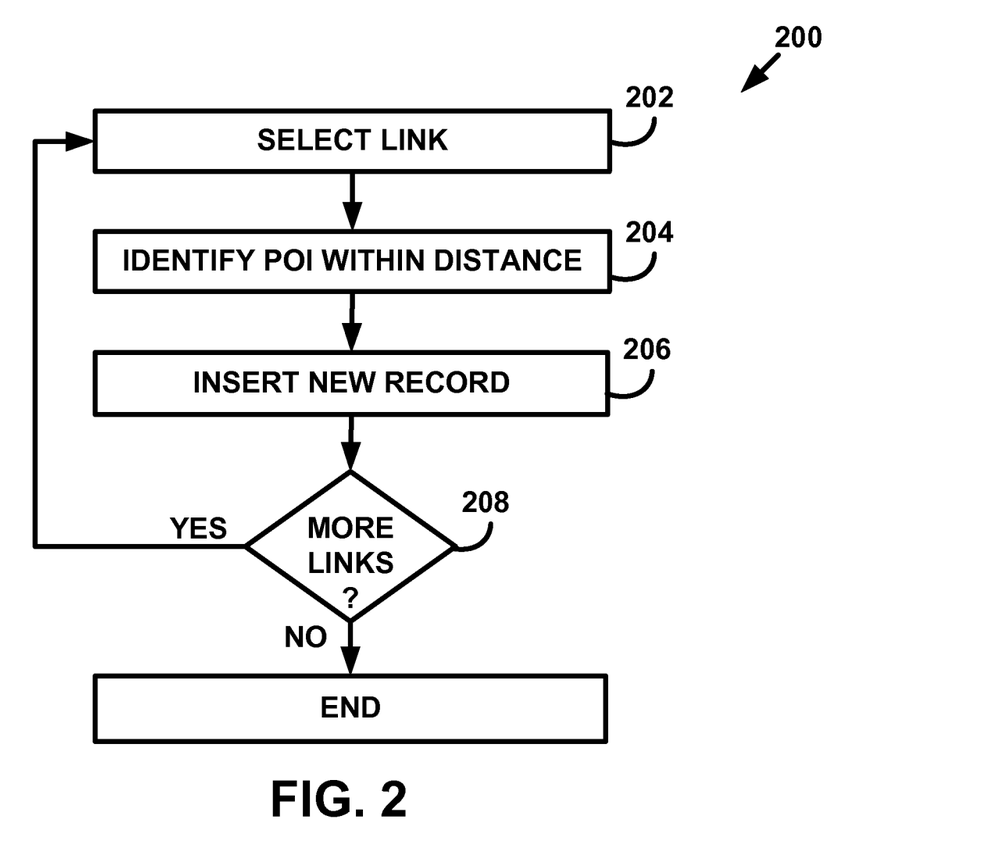
FIG. 2 is a flow diagram that illustrates a compilation process using the compiler depicted in FIG. 1, according to an example.
Figure 3:
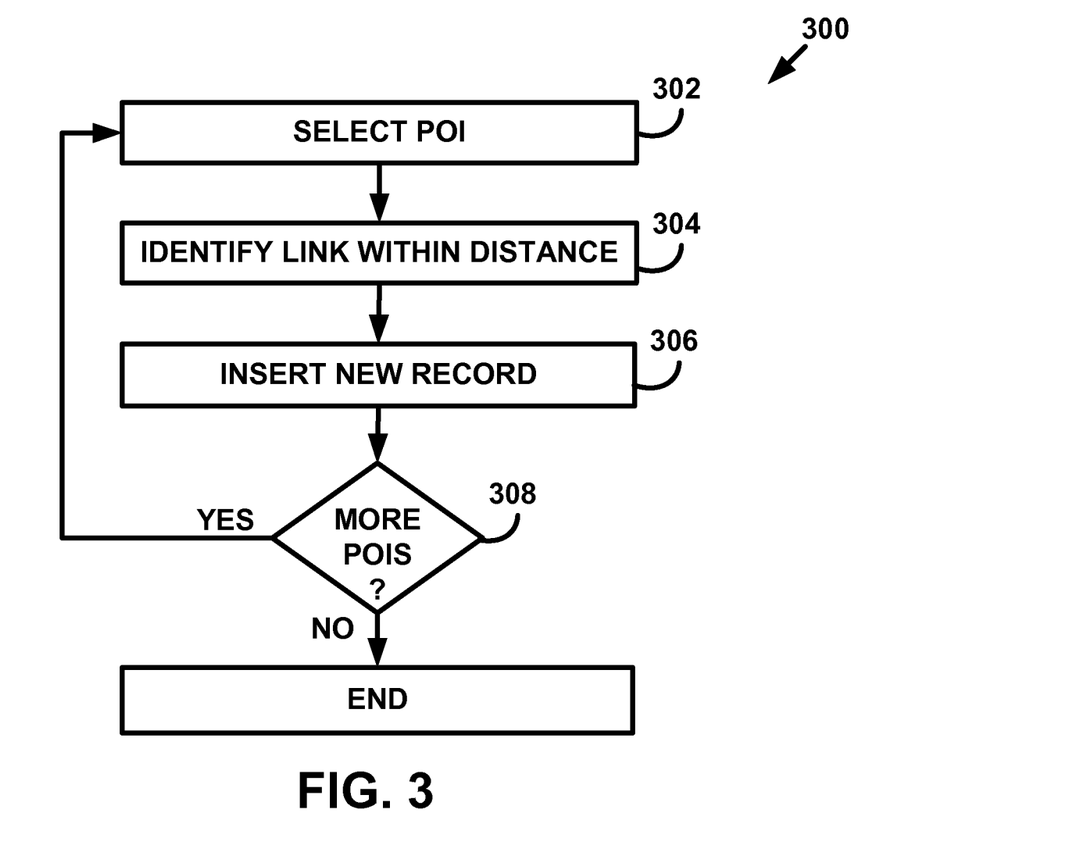
FIG. 3 is a flow diagram that illustrates a compilation process using the compiler depicted in FIG. 1, according to another example.

The distance attribute and relation may be created using a routing algorithm as described with respect to FIG. 2 or using a reverse routing algorithm as described with respect to FIG. 3.

FIG. 2 depicts a flowchart of a compilation process 200 that may be performed by the compiler 104. At block 202, the compiler 104 selects a link represented in a first version of the database, which may be the master version of the database 102 or an intermediate version derived therefrom. Using a routing algorithm, such as the Dijkstra algorithm, the compiler 104 identifies all points of interest located within the reasonable distance value of the link at block 204. At block 206, for all identified POIs, the compiler 104 inserts a new record into the Link2POI relation. The record includes an identifier associated with the link, an identifier associated with the point of interest, and the distance between the link and the point of interest.

For example, at block 202, the compiler 104 selects a link having the link identifier (LinkID) of 4711. At block 204, the compiler 104 uses the reasonable distance value of two kilometers to identify points of interest within that distance. Using a search algorithm, the compiler 104 identifies the points of interest having POI identifiers (POIID) 777 and 987. POI 777 is 0.650 km from link 4711, while POI 987 is 1.450 km from link 4711. At block 206, the compiler 104 inserts the records as depicted in Table 1.

TABLE 1

| Link2POI | | |
|---|---|---|
| LinkID | POIID | Distance |
| 4711 | 777 | 0.650 |
| 4711 | 987 | 1.450 |

At block 208, the compiler 104 determines whether there are more links in the first version of the geographic database that need to be searched. If there are more links, the compiler 104 returns to block 202. Otherwise, the compilation process ends.

FIG. 3 depicts a flowchart of another compilation process 300 that may be performed by the compiler 104. In this process 300, the Link2POI relation is created by using a reverse routing algorithm. The reverse routing algorithm starts the search from a point of interest and identifies all links within the reasonable distance. For example, a modified Dijkstra routing algorithm may be used during the compilation process 300.

At block 302, the compiler 104 selects a POI represented in the first version of the database, which may be the master version of the database 102 or the intermediate version derived therefrom. At block 304, the compiler 104 identifies all links located within the reasonable distance value of the POI. At block 306, for all identified links, the compiler 104 inserts a new record into the Link2POI relation. At block 308, the compiler 104 determines whether there are more POIs in the first version of the geographic database that need to be searched. If there are more POIs, the compiler 104 returns to block 302. Otherwise, the compilation process ends.

At the completion of compilation, the Link2POI relation is the same regardless of whether the compiler 104 runs the compilation process 200 or the compilation process 300. Depending on the number of links and POIs represented in the first version of the database, the Link2POI relation can become quite large.

Binary Large Objects (BLOBs) may be used to reduce the size of the Link2POI relation. A BLOB is a collection of binary data stored as a single entity in a database management system. In one example, the compiler 104 stores the information contained in the Link2POI relation in a relation Link2BlobPOI(LinkID, BLOBPOI), where BLOBPOI contains all POIs that are accessible from the link of this row within the reasonable distance. The BLOB may be encoded using a compressed binary encoding, e.g., delta encoding of POI IDs and/or delta encoding of the distance values. Additionally or alternatively, the compiler 104 may store the information contained in the Link2BLOBPOI relation using binary-compressed BLOBPOI columns, for example, by using zlib.

In order to access the relation Link2BlobPOI(LinkID, BLOBPOI) conveniently, the compiler 104 may generate a virtual table v_Link2POI(LinkID, POIID, Distance) on the basis of the table Link2BlobPOI(LinkID, BLOBPOI). The system querying the v_Link2POI virtual table does so in a similar manner as described with respect to querying the relation Link2POI, for example, using SQL. When accessing the relation v_Link2POI, the virtual table reads from the table Link2BlobPOI the column BlobPOI and then provides the POIs and their distances through the table v_Link2POI to the system performing the query.

Besides the smaller database size, the use of the BLOBs has another advantage. As the table Link2BLOBPOI contains fewer entries than the table Link2POI, there are also fewer entries stored in the B-tree, which is used for indexing the LinkID values in the tables Link2POI and Link2BLOBPOI. The less entries to be indexed, the better for the SQL_querying performance (done by the navigation system) and the inserting performance (done by the compiler).

Note that instead of storing the binary encoded POIs and distances in a BLOB column of a relation, they may also be stored directly as a flexible attribute of the link, which is used in the navigation database standard (NDS). Link attributes are described with respect to FIG. 4.

Another way of reducing the size of the Link2POI relation is to vary the reasonable distance value based on the type of road represented by a link. There are more points of interest in a city than in a rural area. Thus, using a smaller reasonable distance value when compiling city streets reduces the size of the relation. For example, the reasonable distance value may be one kilometer when compiling city streets and three kilometers when compiling highways. As another example, the reasonable distance value may be proportional to the inverse of POI density.

Still another way for reducing the size of the Link2POI relation is to create another relation Link2Link. When there are multiple points of interest within a reasonable distance from a link, a separate record is generated in the Link2POI relation for each POI. Instead of storing a separate record for each POI, the compiler 104 installs a single record in the Link2Link relation having the format: Link2Link(Link_From, Link_To, Distance) and another record in the relation AccessLink4POIs(LinkID, POIID). The AccessLink4POIs relation is typically already available in a geographic database to identify the set of links from which a POI can be directly accessed. Now, the Link2POI relation can be used in a view command as follows.

```
CREATE VIEW Link2POI AS
SELECT l.Link_From as LinkID, p.POIID, l.Distance FROM
Link2Link l,
AccessLink4POIs p where l.Link_To=p.LinkID
```

Figure 4:
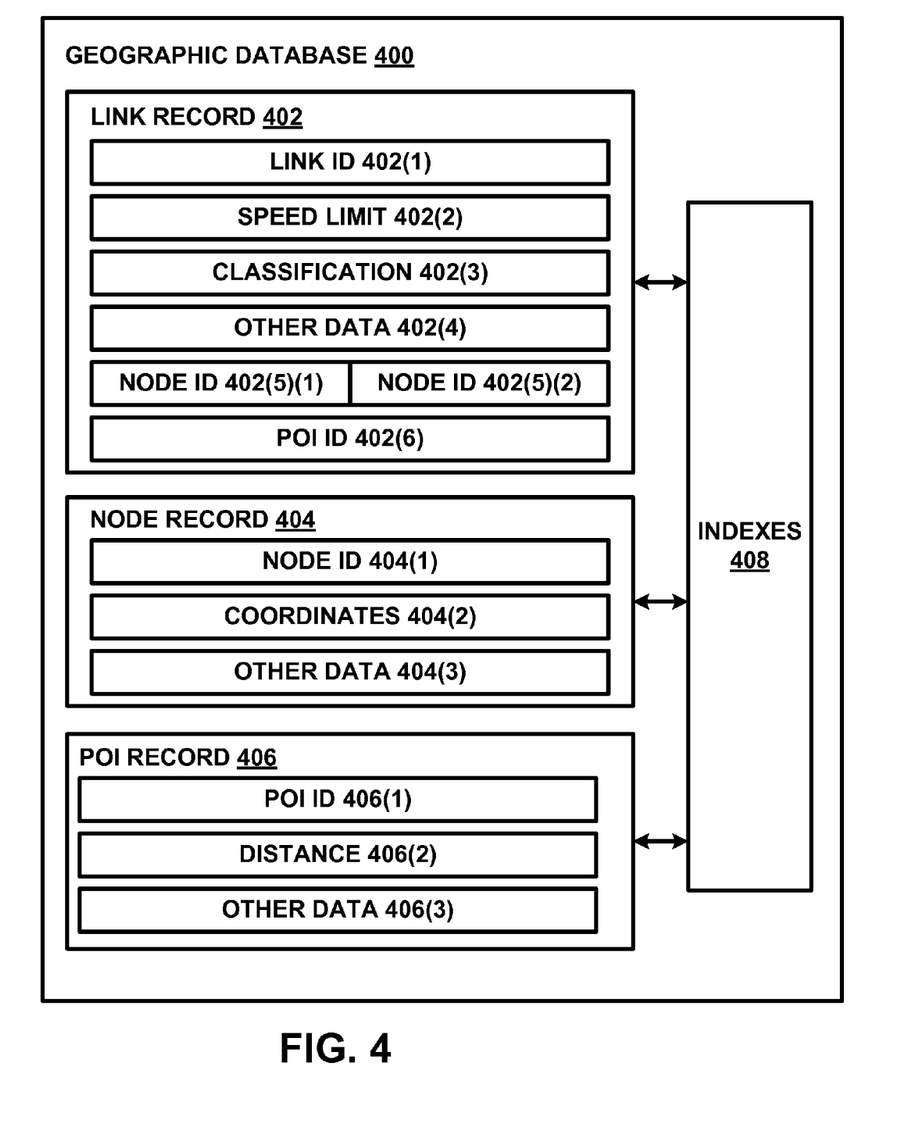
FIG. 4 is a block diagram of a geographic database product; according to an example.

FIG. 4 depicts a geographic database 400. The geographic database 400 contains information about a roadway network in the geographic region. In one embodiment, the geographic database 400 includes node data and link data. These data represent components of the physical road network. The node data represent physical locations in the geographic region (such as roadway intersections and other positions) and the link data represent portions of roadways between the physical locations represented by nodes. (The terms "nodes" and "links" represent only one terminology for describing these physical geographic features and other terminology for describing these features is intended to be encompassed within the scope of these concepts.)

The geographic database 400 is an example compiled database product produced by the compiler 104 using one of the compilation processes 200, 300. The geographic database 400 contains at least one database record 402 (also referred to as "entity" or "entry") for each link (also referred to as "segment") in a geographic region. The link data record 402 includes a link ID 402(1) by which the data record can be identified in the geographic database 400.

Each link data record 402 has associated with it information (such as "attributes", "fields", etc.) that describes features of the represented road segment. For example, the link data record 402 includes a speed limit attribute 402(2) that includes data indicating a speed limit or speed category (i.e., the maximum permitted vehicular speed of travel) on the represented road link. As another example, the link data record 402 includes a classification attribute 402(3) that includes data indicating whether the represented road link is part of a controlled access road (such as an expressway), an arterial road, or a local road. As there may be many other attributes associated with a link, FIG. 4 depicts an other data attribute 402(4).

Each road link is associated with two nodes. One node represents the point at one end of the road link and the other node represents the point at the other end of the road link. The node at either end of a road link may correspond to a location at which the road meets another road, i.e., an intersection, or where the road dead-ends. Accordingly, the link data record 402 also includes a first node ID 402(5)(1) for the first end of the link and a second node ID 402(5)(1) for the second end of the link. The first node ID 402(5)(1) and the second node ID 402(5)(2) are also located in a node record 404.

As described, the node record 404 includes a node ID 404(1) by which the data record can be identified in the geographic database 400. The node record 404 also includes the geographic coordinates (e.g., the latitude and longitude) 404(2) of the node. As there may be many other attributes associated with a node, FIG. 4 depicts an other data attribute 404(3).

Each road link may also be associated with one or more points of interest. Accordingly, the link data record 402 also includes a point of interest ID 402(6) for each point of interest associated with the link. The point of interest ID 402(6) is also located in a POI record 406.

The POI record 406 includes a POI ID 406(1) by which the data record can be identified in the geographic database 400. The POI record 406 also includes the distance 406(2) determined during the compilation process 200, 300. The POI record 406 may also include attributes for the type or category of a point of interest (e.g., restaurant, hotel, city hall, police station, historical marker, ATM, golf course, etc.), the location of the point of interest, a phone number, hours of operation, web page, and so on. As there may be many other attributes associated with a point of interest, FIG. 4 depicts an other data attribute 406(3).

The geographic database 400 also includes indexes 408. The indexes 408 provide cross references, search trees, and/or other data finding techniques. The indexes 408 include the Link2POI relation and variations described herein. One variation to the Link2POI relation is adding additional columns.

For example, the column Category may be added to the relation to support queries such as "Give me all POIs along the route for a certain category." In this example, the Link2POI relation has the format Link2POI(LinkID, POIID, Category, Distance). This example also works with the BLOB approach with the Link2BLOBPOI relation having the format Link2BLOBPOI(LinkID, Category, BLOBPOI).

As another example, the column Time may be added to the relation to support queries such as "Give me all POIs that can be reached in five minutes." Data in the Time column is the time to travel from link having the LinkID to the POI having the POIID. In some systems, the Time column may replace the Distance column in the Link2POI relation. This example also works with the BLOB approach as the relation Link2BLOBPOI(LinkID, BLOBPOI), where the BLOBPOI column contains the time necessary to reach a POI from a certain link.

Figure 5:
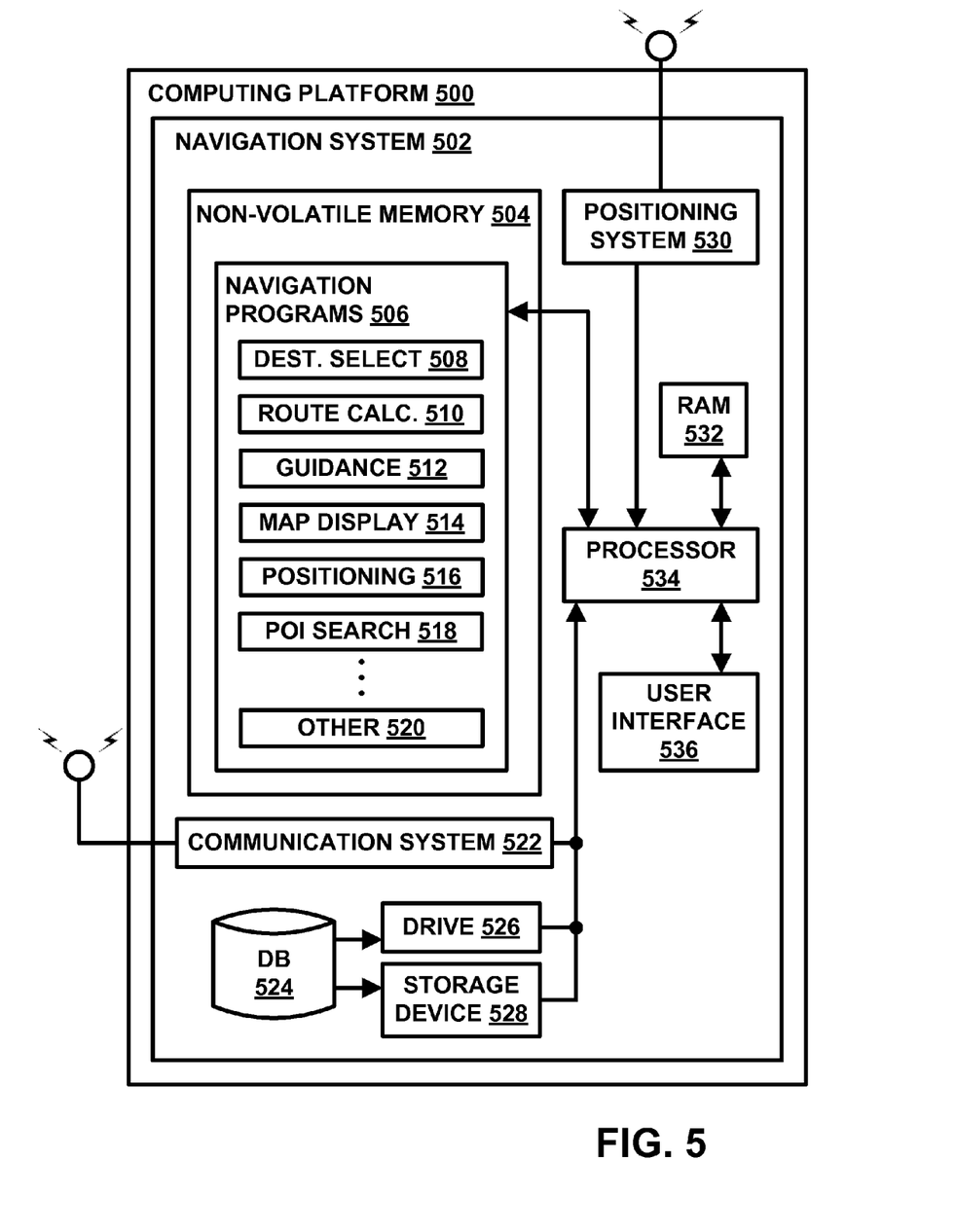
FIG. 5 is a block diagram of a navigation system, according to an example.

FIG. 5 is a block diagram of a navigation system 502 associated with a computing platform 500. The computing platform 500 may be associated with a vehicle. Additionally, the computing platform 500 may be a tablet, mobile telephone, personal computer, or any other computer. The navigation system 502 is a combination of hardware and software components. In one embodiment, the navigation system 502 includes a processor 534, a drive 526 connected to the processor 534, and a non-volatile memory storage device 504 for storing navigation application software programs 506 and possibly other information.

The navigation system 502 also includes a positioning system 530. The positioning system 530 may utilize GPS-type technology, a dead reckoning-type system, or combinations of these or other systems, all of which are known in the art. The positioning system 530 may include suitable sensing devices that measure the traveling distance speed, direction, orientation, and so on. The positioning system 530 may also include a GPS system. The positioning system 530 outputs a signal to the processor 534. The navigation application software programs 506 that run on the processor 534 use the signal from the positioning system 530 to determine the location, direction, orientation, etc. of the computing platform 500.

The navigation system 502 also includes a user interface 536 that allows the end user to input information into the navigation system 502 and obtain information from the navigation system 502. The input information may include a request for navigation features and functions of the navigation system 502. To provide navigation features and functions, the navigation system 502 uses a geographic database 524. One example of a geographic database 524 is the geographic database 400 depicted in FIG. 4.

In one embodiment, the geographic database 524 is stored on a storage medium, such as a CD-ROM or DVD, that is installed in the drive 526 so that the geographic database 524 can be read and used by the navigation system 502. In one embodiment, the navigation system 502 also includes a storage device 528, such as a hard disk or memory card, on which a portion of the geographic database 524 is stored. In one embodiment, the geographic database 524 may be a geographic database published by NAVTEQ North America, LLC of Chicago, Ill. The geographic database 524 does not have to be physically provided at the location of the navigation system 502. In alternative embodiments, some or the entire geographic database 524 may be located remotely from the rest of the navigation system 502 and portions of the geographic data provided via a communications system 522, as needed.

In one exemplary type of system, the navigation application software programs 506 load from the non-volatile memory storage device 504 into a random access memory (RAM) 532 associated with the processor 534. The processor 534 also receives input from the user interface 536. The navigation system 502 uses the geographic database 524 stored on the storage medium and/or storage device 528, possibly in conjunction with the outputs from the positioning system 530 and the communications system 522, to provide various navigation features and functions. The navigation application software programs 506 may include separate applications (or subprograms) that provide the various navigation-related features and functions. The navigation functions and features may include destination selection 508 (identifying one or more places to be used as a destination based on user input), route calculation 510 (determining a route from an origin to a destination), route guidance 512 (providing detailed directions for reaching a destination), map display 514, and positioning 516 (e.g. map matching). The navigation application software programs 506 also include a point of interest search application 518, which is described with reference to FIG. 6. Other functions and programming 520 may be included in the navigation system 502.

The navigation application software programs 506 may be written in a suitable computer programming language such as C++ or Java, although other programming languages are also suitable. All of the components described above may be conventional (or other than conventional) and the manufacture and use of these components are known to those of skill in the art.

Figure 6:
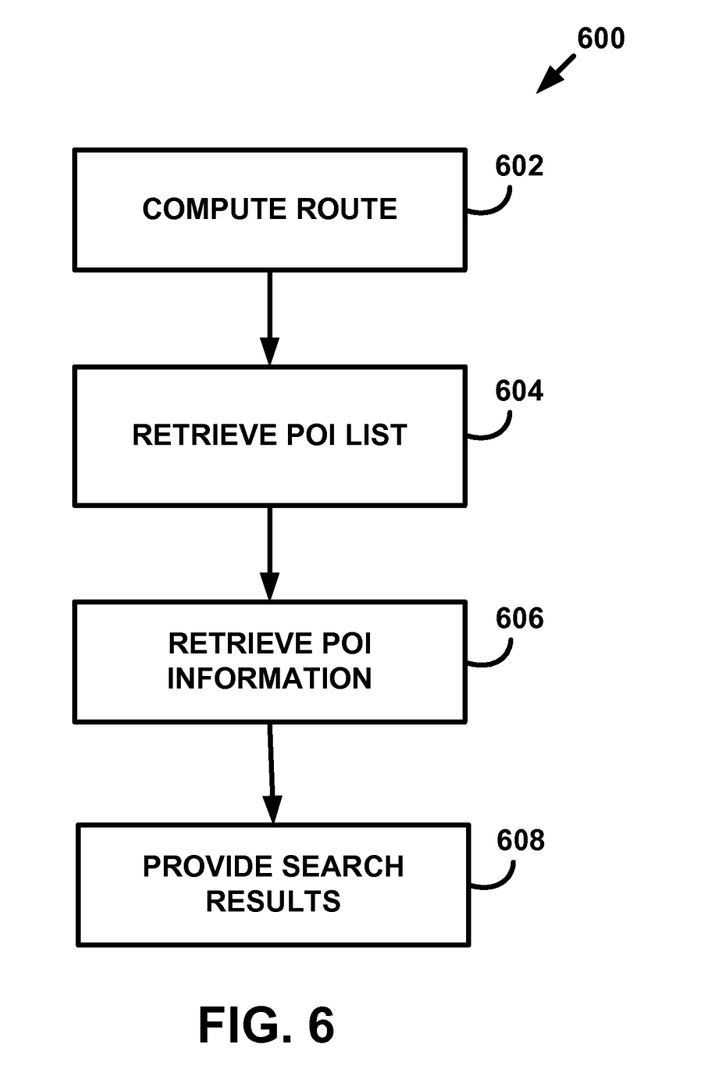
FIG. 6 is a flow diagram of a method of searching for points of interest, according to an example.

FIG. 6 is flow chart of a method 600 for searching for points of interest. A user of the navigation system 502 enters a starting location and a destination into the user interface 536. Alternatively, the navigation system 502 uses its current position based on the position detected by the positioning system 530 as the starting point.

At block 602, the route calculation program 510 calculates a route from the starting point to the destination. The route calculation program 510 may use any suitable routing algorithm, such as the Dijkstra algorithm or the A* algorithm. The calculated route is represented by a sequence of links.

At block 604, the POI search program 518 retrieves a list of POI identifiers for POIs located within a reasonable distance from the route. The POI search program 518 queries the relation Link2POI using the route as a query object to retrieve the list of POI identifiers. Using SQL as a non-limiting example, the POI search program 518 may use the following query to obtain the POI list.

```
SELECT POIID FROM Link2POI where LinkID in (SELECT LinkID
FROM routepath) and Distance <= Dist_Query.
```

In this query, Dist_Query is a distance that may be provided by the user. Additionally or alternatively, the POI search program 518 may have a default distance that is used when the user does not specify a distance to be used in the search.

At block 606, the POI search program 518 retrieves information regarding the POIs identified in the POI list obtained at block 604. For example, the POI search program 518 may obtain location, category, or name from the point of interest record 406 associated with the POI identifier.

At block 608, the navigation system 502 provides search results to the user. For example, the route guidance program 512 may provide audible guidance that a particular POI is located at a distance from the user's current position on the route. As another example, the map display application 514 may present the POIs on a map display along with the user's current position.

The relation Link2POI also supports queries like "Order all POIs relative to the distance of the current car position" or "Find all POIs reachable within Dist_Query from the current car position." After the positioning application 516 locates the link associated with the navigation system's current position ((CP), i.e. LinkCP), the POI search program 518 may perform the following queries.

```
SELECT POIID, Distance FROM Link2POI where LinkID = LinkCP
order by distance
``` or

```
SELECT POIID, Distance FROM Link2POI where LinkID =
LinkCP and Distance <= Dist_Query.
```

By generating and storing the relation Link2POI(LinkID, POIID, Distance) (and any alternatives described herein) in a geographic database prior to use, a navigation system (or other system using the database) can accurately identify points of interest along a route more efficiently. While a standalone navigation system example was described in detail, the geographic database that includes the relation may be stored on a server and queried by a client device. For example, a client device such as a mobile telephone may send a route to a server and the server returns a list of points of interest to the client device. It is also possible that both the route calculation and the compilation of the POIs along the route are performed on the server. In this example, the client device sends the origin and the destination to the server and the server returns the calculated route and associated POIs to the client device.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. An apparatus comprising:
   a geographic database including link identifier values for a plurality of links that represent portions of paths; and
   a processor configured to receive a selected link identifier value and identify at least one point of interest located apart from a link specified by the selected link identifier and within a predefined distance from the link specified by the selected link identifier.

2. The apparatus of claim 1, wherein the geographic database includes a relation for each link identifier value that identifies the points of interest within the predefined distance from the plurality of links.

3. The apparatus of claim 1, further comprising:
   a user interface configured to receive an input associated with the selected link identifier value.

4. The apparatus of claim 3, wherein the input is a destination location in a geographic region.

5. The apparatus of claim 3, wherein the input is a selected point of interest.

6. The apparatus of claim 1, wherein the predefined distance is variable as a function of a type of path represented by the link specified in the selected link identifier.

7. The apparatus of claim 1, wherein the predefined distance is set to a small value in urban areas and a large value in rural areas.

8. The apparatus of claim 1, further comprising:
a positioning device configured to generate location data for the apparatus, wherein the selected link identifier value is selected based on the location data.

9. The apparatus of claim 1, wherein the at least one point of interest located apart from the link is stored in the geographic database in a binary large object.

10. An apparatus comprising:
a memory configured to store a geographic database;
an input device configured to receive an input identifying a data entry of the geographic database; and
a controller configured to identify links of the geographic database within a predetermined distance from a feature represented by the data entry.

11. The apparatus of claim 10, wherein the feature represented by the data entry is a point of interest or a road.

12. The apparatus of claim 10, wherein the data entry of the geographic database is identified from a reverse routing algorithm that starts with a point of interest.

13. The apparatus of claim 10, wherein the predetermined distance is a function of a type of path in a route based on the data entry.

14. The apparatus of claim 10, wherein the predefined distance is set to a small value in urban areas and a large value in rural areas.

15. The apparatus of claim 10, wherein the controller is configured to generate a relation between the links of the geographic database and the data entry.

16. A navigation system comprising:
a geographic database including node data and link data; and
a processor configured to identify link data of the geographic database within a predetermined distance from a selected feature of the geographic database.

17. The navigation system of claim 16, wherein the selected feature is a link that represents a path in a route.

18. The navigation system of claim 17, wherein the predetermined distance is a function of a type of the path in the route.

19. The navigation system of claim 16, wherein the selected feature is a point of interest.

20. The navigation system of claim 19, wherein a database entry associates the link data of the geographic database within the predetermined distance from a route to the point of interest.

* * * * *